May 25, 1926.

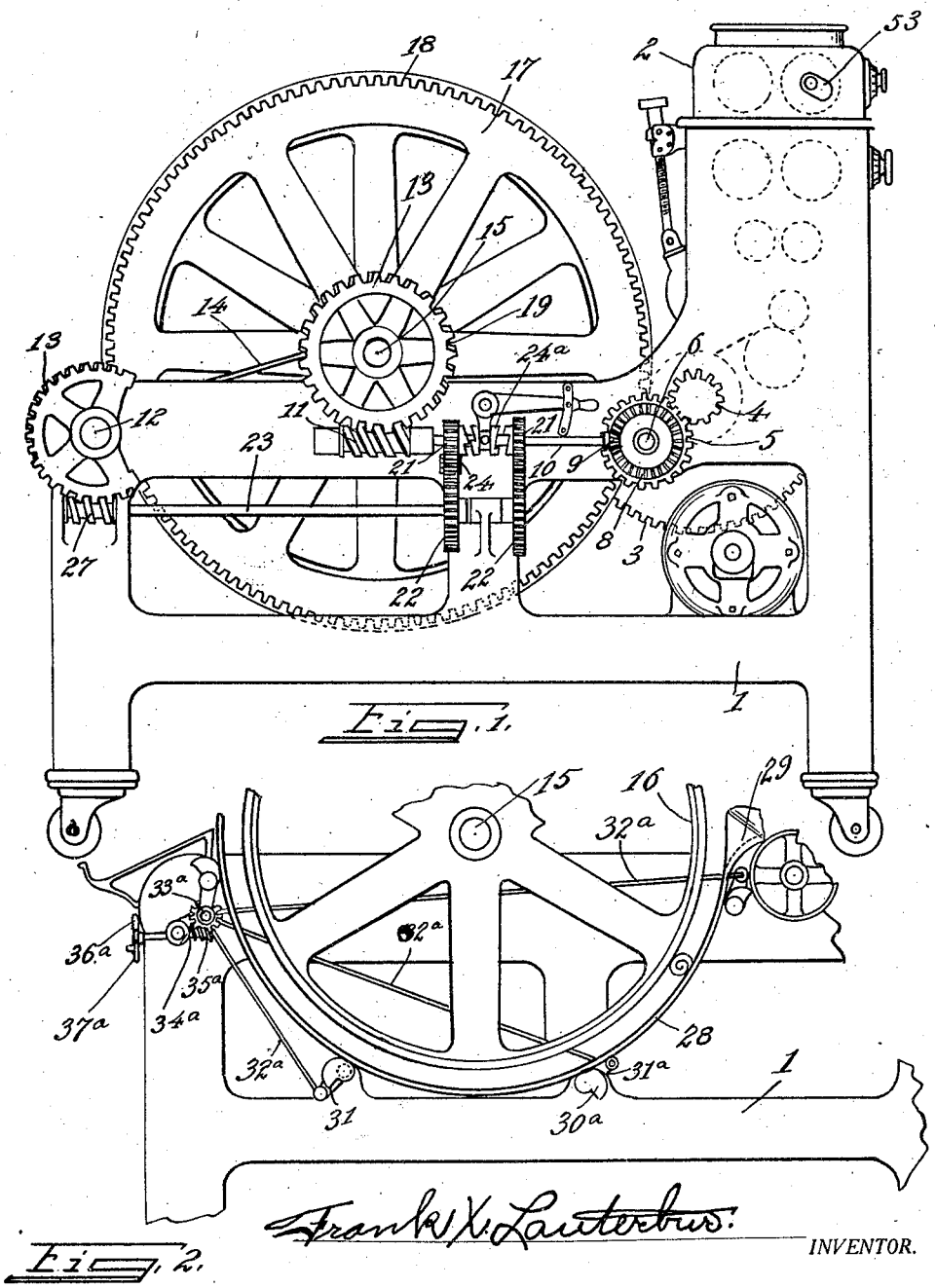

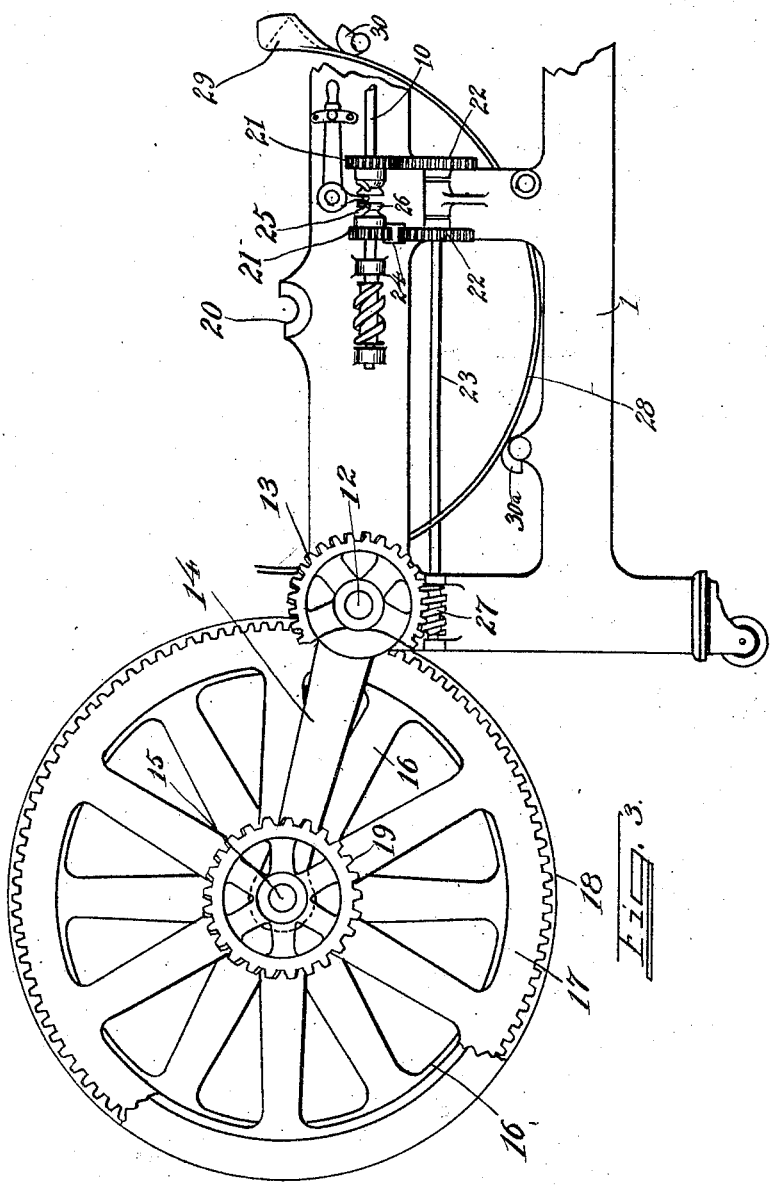

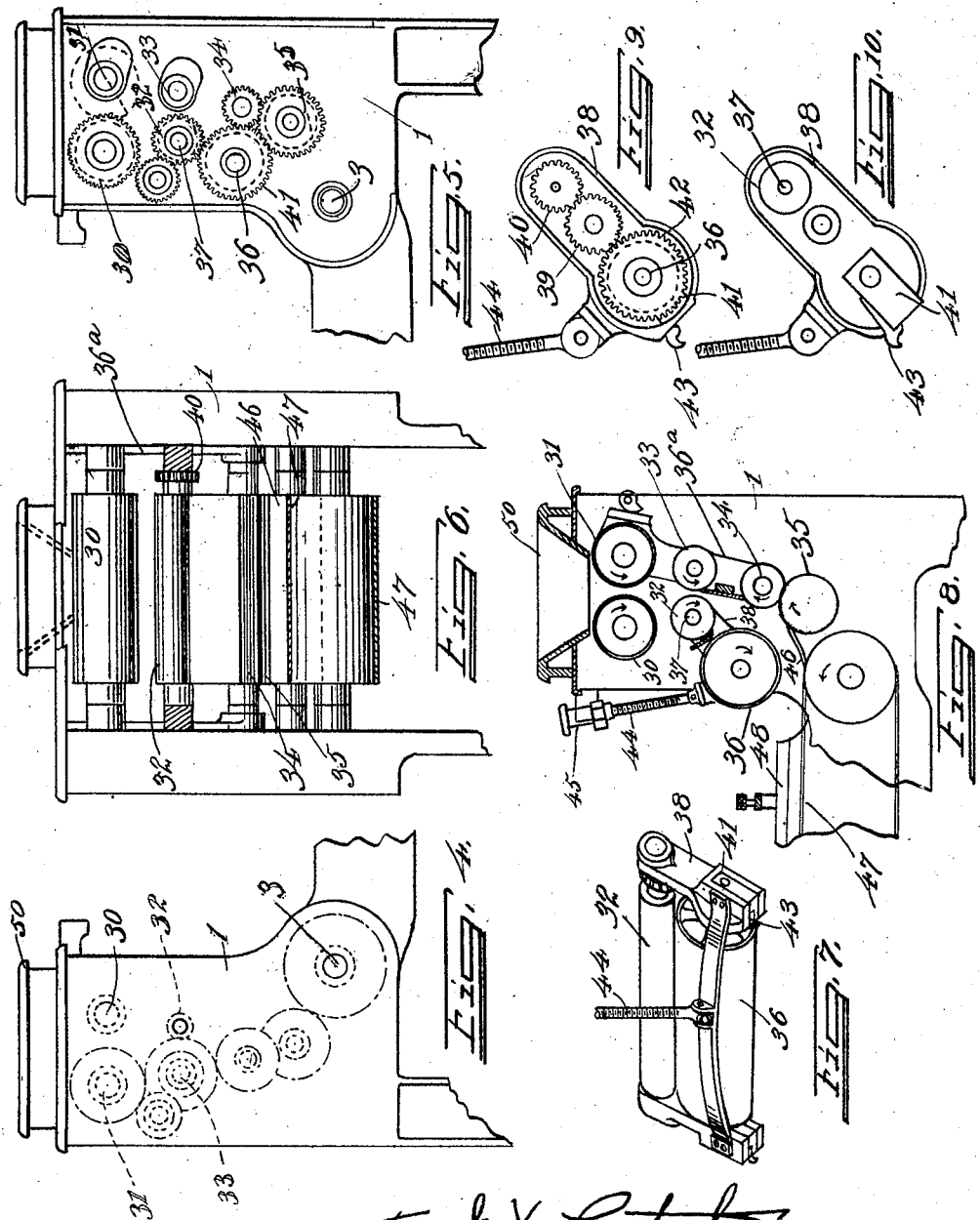

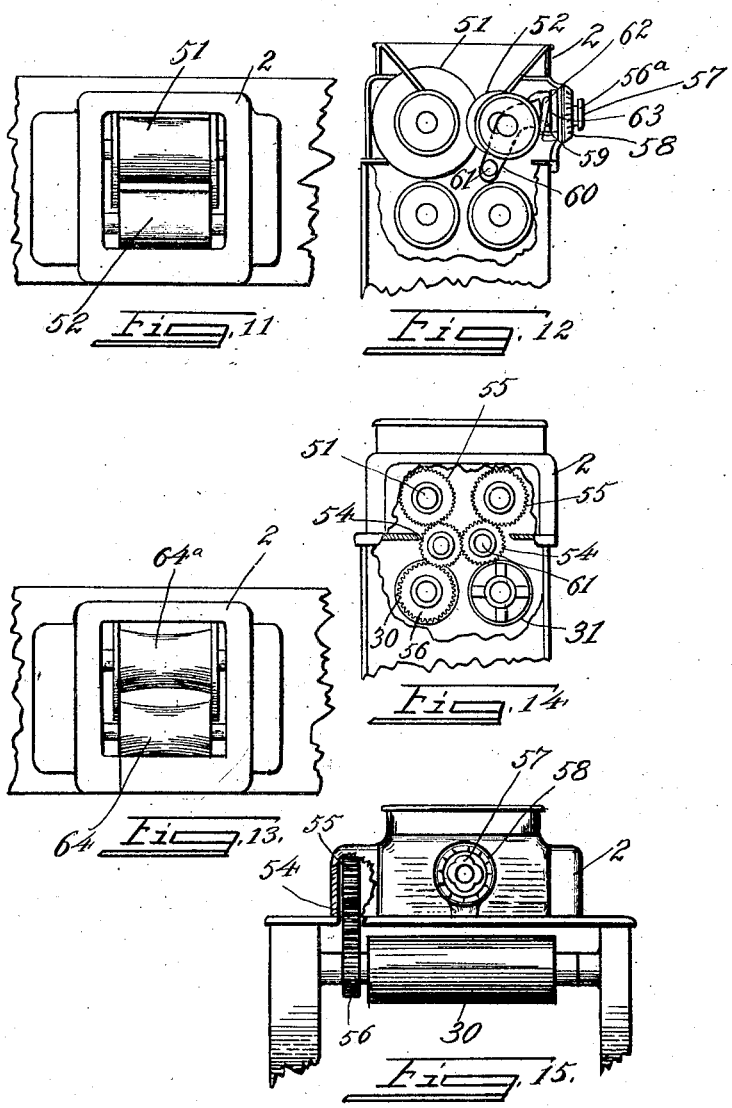

F. X. LAUTERBUR 1,585,724

LOAF MOLDING MACHINE

Filed Sept. 12, 1921

Frank X. Lauterbur, INVENTOR.

Patented May 25, 1926.

1,585,724

UNITED STATES PATENT OFFICE.

FRANK X. LAUTERBUR, OF SIDNEY, OHIO.

LOAF-MOLDING MACHINE.

Application filed September 12, 1921. Serial No. 500,053.

My invention relates to machines for forming dough into rolls or loaves, including in the complete machine a sheet forming step, a coil forming step and a molding step for the coil.

In machines of this type in the prior art there are the traveling belt loaf molding elements and the drum type molding elements; this machine in so far as this portion of it is concerned has a drum type element.

Among other objects of my invention is the provision of a drum type molding element which has separately driven lateral extensions to take the place of flanges, whereby the loaves are formed straight and true. Also I provide for a method of assembling and driving the drum, which permits of easy and immediate access to the various parts of the special mechanism, and also to the remainder of a machine of the type noted.

In connection with the other elements of the machine it is my object to provide an excess pressure unit to be used where extra introductory pressure is desired, and throughout the remainder of the unit I provide for adjustments of co-ordinated character, whereby the adjustable features are rendered simple and well within the capacity of the ordinary workmen.

It is my object also to improve the mechanisms for lifting a coil of dough from the coil forming pocket, omitting the use of traveling belts, which this machine is specially designed to avoid where possible, thereby lessening the cost of cleaning and upkeep, this last noted improvement also permitting me to eliminate large sized drums or rollers from the coiling mechanism.

These objects, together with the necessary changes in driving mechanism and other advantages to be noted, I accomplish by that certain construction and arrangement of parts to be hereinafter more specifically pointed out and claimed.

In the drawings,

Figure 1 is a side elevation of a complete machine embodying all my improvements.

Figure 2 is a detail elevation showing particularly the pressure element which by preference I employ with this machine.

Figure 3 is a detail side elevation showing the preferred method of removing the molding drum by power, thereby exposing the various parts of the machine for cleaning.

Figure 4 is a side elevation of the coil or roll forming portion of the machine showing the arrangement of driving gears on one side of the machine.

Figure 5 is a side elevation of the same device showing the arrangement of the various journals of the operating rolls and gears on the opposite side of the machine.

Figure 6 is a front elevation of the rolls.

Figure 7 is a perspective view of the adjustable unit forming part of the coil forming pocket and trip device.

Figure 8 is a side elevation with the case removed of the various rolls in the coil forming portion of the machine showing their relative mounting device.

Figure 9 is a detail elevation of the device shown in Figure 7 showing the gear arrangement.

Figure 10 is a view taken from the other side of the parts shown in Figure 9 showing the demountable roll journal block.

Figure 11 is a top plan view of the demountable excess pressure unit.

Figure 12 is a center cross view of excess pressure or feeding attachment, showing its position with respect to regular feed rolls.

Figure 13 is a view similar to Figure 11 showing a different form of drum or roller.

Figure 14 is a side elevation similar to Figure 12, but taken from the opposite side, showing the gear arrangements.

Figure 15 is an end elevation of the excess pressure unit.

Figure 16:
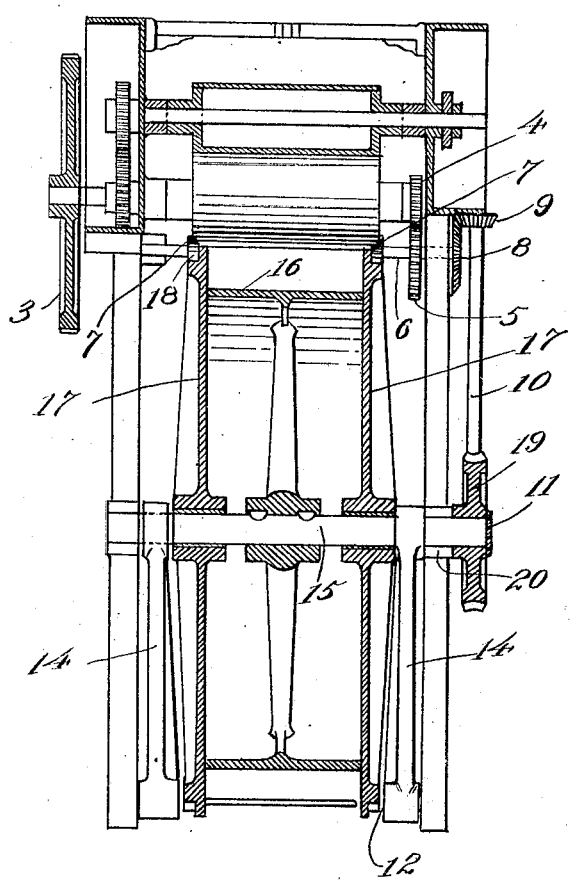
Figure 16 is a horizontal section taken centrally through the molding drum.

Although the frame of the machine has a number of elements which may be separate and attached to each other in units or a single piece, I have indicated as at 1 a frame for the entire machine, and at 2 a frame for the excess pressure unit.

Referring first to Figures 1, 2, 3, and 16, which show the loaf molding element, as distinguished from the sheet and coil forming parts, it will be noted that the main driving gear 3 carries on its shaft a gear 4 for the molding unit. This gear meshes with a gear 5 on a shaft 6, which shaft carries pinions 7 for the drum flange members.

The shaft has also a beveled gear 8 thereon which meshes with a like gear 9 on a shaft 10. The shaft 10 has a worm 11 thereon and is supported on the frame so that the worm 11 is in position to drive the drum member when same is in operative position.

At the delivery end of the device now being described is a shaft 12, which has a worm wheel 13 thereon and also has a pair of arms 14 rigid thereon and adapted to carry the drum device.

The drum device is made up on a shaft 15 held in the said arms, and has a drum member 16 fast on said shaft and a pair of wheels 17 held closely on each side of the drum so as to form flanges extending beyond its periphery.

These wheels or flange members are loose on the shaft and cut on their edges with gear teeth 18. The pinions 7, above referred to, mesh with these peripheral teeth and drive the flanges independent of the drum.

The drum shaft 15 has a worm wheel 19 thereon, which meshes with the driving worm 11 when the shaft is set into journals 20 on the frame of the machine. I have not shown any top members for these journal forming depressions 20, since, as will be noted, the worm and gear drive for the drum shaft mounting arms 14 provides a self-locking device to hold the drum down.

The parts so far described show illustrative mechanism embodying the principle of my invention for drum type machines, wherein the drum moves at a speed that is desired for proper loaf molding, and the flanges move at a slower speed calculated to equal the lag imparted to the dough coils or rolls as they pass around with the drum in contact with a fixed pressure plate.

This insures against forming curved loaves and saves the operator in many cases from entirely spoiling a batch of dough through clogging and mis-shapen products.

The shaft 10 carries a pair of loose gears 21 meshing with a pair of gears 22 on a shaft 23. Intermediate the one of the gears 21 and its gear 22 is a reversing pinion 24 suitably secured on the frame and constituting the intermediate meshing member between the shaft 10 and the shaft 23.

Mounted on the shaft 10 intermediate the two gears 21 is a clutch member 24$^a$ having toothed connection for positively driving the gear 22 toward which it is moved. In Figure 3 is shown a modified form of clutch, wherein the friction double clutch 25 is mounted on the shaft between the gears 21 and is caused to engage either separately, thus giving convenient forward or reverse movement at this point.

This friction drive may be preferred in some machines and is shown as an alternative form.

On the shaft 23 is a worm 27, which meshes with the worm wheel 13 on the drum arm mounting shaft, so that dependent upon which way the clutch device is thrown the shaft 23 will slowly revolve and swing the drum and the flange members entirely out of the molding unit into the position shown in Figure 3.

This device permits me to easily lift the drum from the molding unit and expose the other parts as well and bring the drum into an easy position for cleaning.

In the usual machine of this type the pressure members are made sectional and must be unbolted or moved out in some way so as to expose a portion of the internal mechanism for cleaning. It is a very great improvement to have this perfectly exposed position of all parts and makes the drum type machine really practical for continuous operation at the bakery, as compared to the flat belt conveyor type.

The pressure elements, shown by me as illustrative of any type that may be desired and showing a preferential structure, comprise a resilient plate of metal 28 secured at the receiving end to the frame of the machine at 29.

This plate is curved around the lower half of the drum within the machine casing and rests on a series of cams 30$^a$ pivotally secured in the frame, and each cam having a crank 31$^a$ on its mounting stud to revolve it.

The cranks are connected by rigid links 32$^a$ with a master cam 33$^a$, and this cam has on its stud a worm wheel 34$^a$ meshing with a worm 35$^a$. The stud and worm are mounted in the machine frame and the worm is operated by a crank 36$^a$ on its shaft, which crank is preferably devised so as to operate over a notched quadrant 37$^a$ on the exterior of the machine at the delivery end thereof.

This construction provides means for readily adjusting the distance of the pressure member from the face of the drum, and since the pressure member is devised to lie within the flange members of the drum mechanism, and the operating member moves over a quadrant, it will be readily possible to gauge the pressure applied to the dough by position of the operating crank over the quadrant.

I do not wish to confine myself in this portion of my machine to combinations with any special form of coil producing mechanism, nor do I wish to limit myself to any special mechanism for lifting out the drum, since a removable drum in such machines is entirely unknown in the art so far as I am advised, nor do I wish to limit myself to any special or described means of driving the special drum with separate flanges or the separate flanges themselves.

*The sheet forming and coil forming parts.*

The usual complement of rolls in a sheet forming and coiling box are the receiving rolls, the sheet forming rolls, and the coiling rolls or devices which roll up the sheets into a pocket from which the coil feeds or trips out when it reaches a desired size.

Dependent upon the nature of the dough and the kind of loaf to be made, the adjustments of the various rolls above noted should be arranged for, and in my present device are provided with as few separately operated points of adjustments as possible. Thus the receiving and sheet forming rolls are adjustable together, and the trip pocket and coiling devices are adjustable separately from the others. Also where the excess pressure unit is used it will have its own adjustment.

All the revolving parts are driven from a common source and the adjustments are planetary, so that the drive is not interfered with.

The receiving rolls are shown at 30, 31, the latter being the adjustable one. The sheet forming rolls are shown at 32, 33, the latter again being the adjustable one. The coil or pocket forming rolls comprise the upper roll 34 and the somewhat larger but not much oversize roll 35, and the third roll or trip roll 36, which is adjustable and demountable entirely.

The rolls 31 and 32 are mounted in a frame 36ª which swings on the shaft of the roll 34. This frame is adjustable in any desired manner (not shown). On the spindles of these rolls are intermeshing gears from the gear on the spindle of the roll 34, whereby all are driven.

On the sheet forming roll spindle 37, which is driven by the gear train of the device from the spindle of the roll 32, is a frame 38, which swings on this spindle and carries an idler gear 39 meshing with the gear 40 on the spindle 37.

The side arms of this frame are formed with pockets therein to slidably receive the journal boxes 41 in which is mounted the fairly large roll 36. These boxes may be slid into the pockets and held by latches 43, whereupon the gear 42 on the spindle of the roll 36 will mesh with and be driven by the idler above mentioned.

The frame itself is adjustable by means of a rod 44 swung from the center of the cross member thereof and supported by engagement with the adjustable head 45 thereon.

As so constructed the dough comes through the receiving rolls, and thence to the sheet forming rolls, being formed into a strip of the desired thickness by the joint action of said rolls.

The end of the sheet is turned in by the roll 35, turning in the direction of the arrow thereon (Figure 8) and coiled inwardly by the oppositely turning roll 34. The roll 36 forms a third side to the pocket formed by the rolls 34 and 35, so that when the sheet has been coiled up it will contact with the roll 36 and be tripped or forced out of the pocket so as to fall upon the apron 46, which guides it to the loaf molding device.

This coil forming member of the machine could be used with the horizontal belt molder (Figure 8), wherein there is the conveyor 47 and the pressure board 48, or it could be used with any form of loaf molder desired.

The roll 36 is large enough so that it takes the place of the belt which may be employed in its place and the avoidance of the use of which is an item of saving in construction and up-keep.

The construction of the adjustable mounting for this roll permits its entire withdrawal for cleaning, so that its size does not act as an obstruction of the internal parts of the mechanism.

*The excess pressure unit.*

It is often necessary to provide for considerable pressure on the incoming dough to get proper sheet forming and proper feeding to it and to reduce its mass. As noted I provide a separate frame 2 for this purpose which is to be bolted down after removal of the hopper or top 50 of the machine directly above the receiving rolls.

In this frame 2 are a fixed roll 51 and a movable roll 52, having a slotted journal or guide 53 in the frame. The frame carries (over the gear case portion of the frame of the machine) a pair of gears 54 meshing with each other, and each one meshing with a gear 55 on the ends of the two spindles of the rolls 51 and 52.

One of the gears 54 meshes with the gear 56 on the fixed receiving roll, and due to the arcuate shape of the journal slot in the case 2, the movement of the spindle of the roll 52 will not free the driving gears therefor from intermeshing position.

To give adjustment to the roll 52 I provide a stud 56ª which is set revolubly in the case with a head 57 working over a calibrated dial 58. A cross bar 59 is swung by means of arms 60 from the shaft 61 which mounts the gear 54 adjacent the movable roll. The arms 60 support the roll 52 and bar 59 has a cam 62 thereon which presents its face to a cam 63 on the stud 56ª. By revolving the stud the cams act to thrust the roll 52 toward the fixed roll or permit it to take a lower position further from the periphery of the fixed roll.

Should it be desired to give extra molding effect and strong feed to the dough, the unit above described may be fitted with concave rollers 64 and 64ª instead of the rolls 51 and 52.

The form of adjustment is merely illustrative of any desired method of applying pressure, but with my device now noted the usual receiving rolls may have their faces spaced proportionately to the sheet forming rolls as is highly desirable, and still the dough may be initially treated with considerable pressure to give a desired action without affecting this proportionate arrangement.

When a batch of dough is used that does not require this excess pressure, then the device is removed and the usual hopper mounted in its place.

Having thus described my invention, what I claim as new and desire to secure by Letters Patent, is:—

1. In a device of the character described, the combination with a fixed contact element of curved shape, of a rotary drum whose periphery lies adjacent said contact element, flange members for the drum independent rotatable with relation thereto, and means for rotating the drum and the flanges at different relative speeds and means of moving the drum and the flange members out of contact with the contact element.

2. In a device of the character described, the combination with a contact element of fixed position, a rotary drum positioned to bring its periphery adjacent said contact element, and means for movably mounting said drum in such position so that it can be swung away therefrom comprising pivoted arms and an axle in the arms for the drum.

3. In a device of the character described, the combination with a contact element of fixed position, a rotary drum positioned to bring its periphery adjacent said contact element, and means for demountably supporting said drum in such position, and means for mechanically lifting the drum from said position.

4. In a device of the character described, the combination with a contact element of fixed position, a rotary drum positioned to bring its periphery adjacent said contact element, power means for driving the drum, and means connected to said power means for moving said drum away from said position to expose it and the contact element for cleaning and the like.

5. In a device of the character described, the combination with a contact element of fixed position, a rotary drum, arms carrying said drum, means for rotating the drum, said arms being adapted to take a position to bring the drum adjacent the contact element and to remove it from such position.

6. In a device of the character described, the combination with a contact element of fixed position, a rotary drum, arms carrying said drum, means for rotating the drum, said arms being adapted to take a position to bring the drum adjacent the contact element and to remove it from such position, and connection from the drum rotating means to operate the arms.

7. In a device of the character described, the combination with a curved, adjustable pressure element, a rotary drum co-operating therewith to form a loaf of dough, flanges for the drum independently rotatable with relation thereto, and movable means for mounting the drum and flanges, whereby it may be positioned to co-operate with the pressure element or be removed from such position to expose said element.

8. In a device of the character described, a frame, a curved pressure member in said frame, a pair of conjointly operable arms, a forming drum on said arms, a power means, intermeshing means on the drum to engage the power means when the arms are in position to bring the drum adjacent the pressure member, and intermeshing means on the arms to swing them into the position above noted and other positions.

9. In a device of the character described, a frame, a curved pressure member in said frame, a pair of conjointly operable arms, a forming drum on said arms, a power means, intermeshing means on the drum to engage the power means when the arms are in position to bring the drum adjacent the pressure member, and intermeshing means on the arms to swing them into the position above noted and other positions, said intermeshing means being of self-locking type.

10. In a device of the character described, a power shaft having a worm thereon, a clutch device on said shaft, another shaft adapted to be connected to the power shaft through said clutch, a worm on said shaft, a drum, arms on which the drum is held, a shaft for said arms, having a gear to mesh with the last noted worm, a support for the drum when in operative position, and a gear on the drum to mesh with the first mentioned worm when in such supported position.

11. In a device of the character described, a pressure member, a shaft movable to and from said member, a drum on said shaft, revolubly mounted flange members for the drum on said shaft, driving means for the shaft, and teeth on the flange members, and gears to engage said teeth to drive the flange members at a different speed from the drum.

12. In a device of the character described, a pressure member, a drum, independently movable flanges for said drum, and journaled arms adapted to support the drum and flanges, and movable to bring the drum into and out of position adjacent the pressure member.

13. In a machine of the character described, the combination with means for delivering a sheet of dough, of a pair of rolls adapted to coil said sheet into a cylinder, and a third roll adjustable with relation to the said pair of rolls, and positioned to form the third wall of a pocket with relation thereto, said roll being revolved to trip the cylinder of dough when it has reached size sufficient to contact therewith, the adjustable mounting for said roll comprising a frame in which the roll is mounted, means for swinging said frame and holding it in various positions, and planetary gearing in the frame for said roll to drive it at all times.

14. In a machine of the character described, the combination with means for delivering a sheet of dough, of a coiling roll assembly comprising two oppositely turning rolls positioned in the path of the sheet, and a trip device for the coil of dough comprising a swinging frame adapted to be held in various positions, gearing in said frame, a pair of removable journals in the frame, and a roll in the journals and having driving connection with the said gearing when in position in the frame, said frame being mounted so as to position said roll opposite the pocket formed between the two rolls first mentioned.

15. In a device of the character described the combination with a fixed contact element of curved shape, of a rotary drum or the like, the periphery of which is adjacent the contact element, and side members to laterally enclose the space between the drum and contact element, said members having motion independently of the drum, and the said members and the drum being interconnected and movably mounted so as to swing into and out of operative relation with the fixed contact element.

FRANK X. LAUTERBUR.